United States Patent [19]

Uchiyama et al.

[11] Patent Number: 4,472,936

[45] Date of Patent: Sep. 25, 1984

[54] METHOD AND APPARATUS FOR CONTROLLING COMBUSTION OF GASIFIED FUEL

[75] Inventors: Yoshihiro Uchiyama, Hitachi; Zensuke Tamura, Tokyo; Shigehisa Sugita; Satoshi Tsukahara, both of Hitachi, all of Japan

[73] Assignee: Hitachi, Ltd., Tokyo, Japan

[21] Appl. No.: 334,175

[22] Filed: Dec. 24, 1981

[30] Foreign Application Priority Data

Dec. 27, 1980 [JP] Japan .............................. 55-185010
Jan. 7, 1981 [JP] Japan .................................. 56-463

[51] Int. Cl.³ .......................... F02C 7/26; G05D 7/00
[52] U.S. Cl. .................................. 60/39.06; 60/39.12; 60/39.464; 422/111
[58] Field of Search ................... 60/39.02, 39.06, 39.12, 60/39.464, 733, 746–747; 422/62, 111, 187; 374/36, 37

[56] References Cited

U.S. PATENT DOCUMENTS

| | | | |
|---|---|---|---|
| 2,931,429 | 4/1960 | Brown | 60/39.463 |
| 3,072,468 | 1/1963 | Stitzer | 374/37 |
| 3,772,880 | 11/1973 | Kubota et al. | 60/39.02 |
| 3,783,684 | 1/1974 | DeLivois | 374/37 |
| 4,073,619 | 2/1978 | Lawson | 422/62 |
| 4,261,166 | 4/1981 | Mayrhofer | 60/39.12 |

OTHER PUBLICATIONS

Caruvana, A., "Development of High Temperature Turbine Subsystem Technology to a 'Technology Readiness Status' Phase I" pp. 6–33, 34, Jul. 1977.

Primary Examiner—Louis J. Casaregola
Assistant Examiner—Timothy S. Thorpe
Attorney, Agent, or Firm—Antonelli, Terry & Wands

[57] ABSTRACT

In combustion of gasified fuel by gasifying a low quality fuel and combusting the gasified fuel in a combustor, combustion of gasified fuel is controlled by sampling the gasified fuel at a constant flow rate at the upstream side of the combustor, combusting the sampled gasified fuel, detecting an overall energy level of sensible heat and heating value possessed per unit weight of the gasified fuel on the basis of the combustion temperature of the sampled gasified fuel, and controlling the flow rate of gasified fuel to be led to the combustor in accordance with a fluctuation in the detected overall energy level. Unstable combustion due to a fluctuation in the heating value of the gasified fuel and blow-out due to deficiency of the heating value can be prevented.

11 Claims, 9 Drawing Figures

METHOD AND APPARATUS FOR CONTROLLING COMBUSTION OF GASIFIED FUEL

BACKGROUND OF THE INVENTION

The present invention relates to a method and an apparatus for controlling the combustion of gasified fuel in a system comprising the steps of gasifying a low quality fuel such as coal or heavy oil, combusting the gasified fuel and utilizing the combustion gas for generating power.

An example of the system for combusting the gasified fuel to generate power is a coal-gasification power plant based on the prior art of oxidizing coal with air, and utilizing the resulting gasified fuel as a gas turbine fuel, on which the following description will be based.

As shown in FIG. 1, the coal-gasification power plant comprises a combustion unit, a gas turbine unit, a generator unit and a coal gasification unit, and the combustion unit comprises a compressor 1 and a combustor 2. Air 4 is compressed by compressor 1, and the compressed air 5 is led to combustor 2. Coal-gasified fuel 18 generated in the coal gasification unit is also led to combustor 2 and combusted therein with air 5 as an oxidizing agent to produce combustion gas 7 at a high temperature and a high pressure.

Combustion gas 7 is led to turbine 3 to drive it. Most of power generated by turbine 3 is consumed for revolution in generator 8 to generate electric power. A portion of the power generated by turbine 3 is consumed for revolution in compressor 1.

Flue gas 9 from turbine 3 is led to a waste heat recovery boiler 10 to generate steam at a high temperature and a high pressure, and the generated steam is consumed for driving a steam turbine (not shown in the drawing) and then for revolution in a power generator (not shown in the drawing) connected to the steam turbine to generate electric power.

The coal gasification power plant uses a gasified fuel produced in the coal gasification unit as a fuel in place of the conventional fuel of high heating value such as natural gas, light fuel oil or kerosence which will be hereinafter referred to as "natural gas, etc.".

Generally, coal gasification is based on thermal decomposition of coal at an elevated temperature to gasify it, and the example shown in FIG. 1 is based on combustion of a portion of coal with air and thermal decomposition of the remaining portion of coal by the resulting heat of combustion, which is called "gasification by partial oxidation".

The coal gasification unit based on such partial oxidation of coal, shown in FIG. 1 comprises a coal gasifier 11, a heat recovery boiler 12 and a gas purification device or apparatus 13.

Raw material coal 14, air 15 as an oxidizing agent, and steam 16 for adjusting the gasification temperature and also enriching hydrogen in the gasified fuel by steam reforming are led to gasifier 11, where a portion of coal 14 is combusted with air 15 and the remaining portion of coal 14 is thermally decomposed by the resulting heat of combustion with temperature adjustment of steam 16, whereby gasified fuel 17 is generated as a coal gas containing hydrogen. Air 15 is a portion of air 5 extracted from the line from compressor 1 to combustor 2, and the extracted air is compressed by a boost-up compressor 6 and led to a gasifier 11. In place of the extracted air 15, an oxygen-enriched gas from a free standing oxygen plant can be supplied thereto.

The raw gas 17 generated in coal gasifier furnace 11 is led to heat recovery boiler 12, and heat-exchanged with a heat-exchanging medium therein to recover the sensible heat possessed by raw gas 17, for example, by generating steam.

After the heat recovery, raw gas 17' is led to gas purification apparatus 13, where dusts contained in the gas, reaction products containing sulfur, nitrogen, etc. originating from coal such as $H_2S$ and $NH_3$, and alkali metals such as Na, K, Ca, etc. generated in a vapor state are removed from the gas, whereby purified gas 18 is obtained. The purified gasified fuel 18 is led to combustor 2, as described heretofore.

The coal gasification power plant includes a fuel production unit and is characterized by power generation while producing the necessary fuel, as compared with the one using fuel of natural gas, etc.

The properties and characteristics of coal-gasified fuel for the coal gasification power plant are distinguished in the following points from those of natural gas, etc.

(1) Heating value of coal-gasified fuel is 1/7 to 1/10 of that of natural gas, etc., because air as an oxidizing agent for coal and steam are used, so that inert gas such as $N_2$, $CO_2$, $H_2O$, etc. are contained in the gasified fuel, and a portion of the coal is combusted at the gasification of coal to thermally decompose the remaining portion of coal by the resulting heat of combustion. The heating value of coal-gasified fuel is as low as 1,000–1,500 Kcal/$Nm^3$. In other words, it is necessary to increase the flow rate of gasified fuel to a combustor to produce a combustion gas at the same temperature as that obtained by combustion of natural gas, etc., because combustion is usually carried out in excess of air in the case of a gas turbine. Otherwise, combustion becomes unstable in the combustor.

The minimum necessary heating value of low calorific fuel for maintaining stable combustion depends upon composition of fuel, particularly hydrogen content, structure of combustor and air-fuel ratio, and is 800–1,000 Kcal/$Nm^3$ according to the so far available results of relevant tests. It is known that combustion becomes unstable, or combustion is impossible to continue by blow-out, etc. below the minimum necessary heating value. Particularly, in the case of low load driving of a gas turbine, the air-fuel ratio becomes higher and fuel must be combusted in a lean state.

(2) Heating value, flow rate and temperature of coal-gasified fuel depends upon change in composition of coal, fluctuation in the load of coal gasifier change in the operating conditions of gas purification apparatus.

In contrast to the case of using natural gas, etc. as fuel, the coal gasification unit must be operated at the same time when the gas turbine is to be driven. The heating value, temperature and flow rate of coal-gasified fuel change during the operation by change in operating conditions of the coal gasification unit or uneveness in quality of coal as a raw material.

Combustion gas temperature $T_g$ as a combustor outlet temperature in a gas turbine unit can be represented as below in a form of function by the following factors:

$$T_g = \frac{C_a T_a (G_{ao} - kG_f) + (H_u + C_f T_f) G_f}{\{G_{ao} + (1-k)G_f\} C_g} \quad (1)$$

wherein $C_a$, $C_f$ and $C_g$ represent specific heats at constant pressure of air, fuel and combustion gas, respectively; $G_{ao}$ and $G_f$ represent flow rates of air at the compressor outlet and fuel, respectively; $T_a$, $T_f$, and $T_g$ represent temperatures of air, fuel and combustion gas, respectively; $H_u$ represents heating value of fuel; and k is a constant, which can be represented by the following equation, if the flow rate of extracted air from the air to be led to the coal gasifier by the compressor is $G_{EX}$ and if fuel flow rate $G_f$ is proportional to $G_{EX}$:

$$G_{EX} = kG_f \quad (2)$$

In the case of natural gas, etc. or gasified fuel obtained by gasification of low quality fuel with oxygen, k=0 in the above equation (2).

Since in the case of natural gas, etc. specific heats at constant pressure, $C_a$, $C_f$ and $C_g$, temperatures of air and fuel, $T_a$ and $T_f$, and heating value $H_u$ are substantially constant, the combustion gas temperature $T_g$ is dependent only on the fuel flow rate $G_f$. Thus, adjustment of combustion gas temperature $T_g$, that is, load adjustment of gas turbine, can be made only by controlling the fuel flow rate $G_f$, and very stable control can be carried out.

On the other hand, in the case of gasified fuel as in the present invention, heating value $H_u$ and fuel temperature $T_f$ fluctuate as described above, and thus combusting gas temperature $T_g$ is a function of three variables, i.e. fuel temperature $T_f$, heating value $H_u$, and fuel flow rate $G_f$, and cannot be effectively controlled only by simple detection and control of fuel flow rate $G_f$ as in the case of natural gas, etc. Particularly in the case of coal-gasified fuel, a higher fuel flow rate $G_f$ is required than that in the case of natural gas, etc., and thus fluctuation in fuel temperature $T_f$, i.e. fluctuation in the sensible heat of fuel to be led to the combustor, gives a great influence upon the combustion gas temperature $T_g$. To test a combustibility of a coal-gasified fuel, a combustion test for analyzing a combustion gas by sampling and combusting a portion of gasified fuel has been proposed (FE-1806-22 ERDA (1977) pages 6-33, 6-34, FIG. 6.3.8).

SUMMARY OF THE INVENTION

An object of the present invention is to solve the combustion control problem of gasified fuel encountered in a system comprising the steps of gasifying a low quality fuel such as coal or heavy oil, combusting the gasified fuel and utilizing the combustion gas for generating power, such as coal gasification power plant.

Another object of the present invention is to prevent unstable combustion of gasified fuel due to fluctuation in the heating value of the gasified fuel and also to prevent blow-out of combustion due to the deficiency in the heating value.

Yet another object of the present invention is to properly control the combustion of gasified fuel.

To attain these objects, the present invention provides a method for controlling combustion of gasified fuel in a process for combustion of gasified fuel by gasifying a low quality fuel and combusting the resulting gasified fuel in a combustor, which comprises continuously sampling a gasified fuel at a constant flow rate at the upstream side of the combustor, combusting the sampled gasified fuel, thereby detecting an overall energy level of sensible heat and heating value possessed per unit weight of the gasified fuel on the basis of a combustion temperature of the sampled gasified fuel, and controlling an actual flow rate of the gasified fuel to the combustor in accordance with fluctuations in the detected overall energy level.

In the present invention, the resulting combustion gas in the combustor is utilized in a power-generating plant, for example, gas turbine, and a flow rate of the gasified fuel to the combustor is computed from the detected overall energy level and the required power output from the power-generating plant, and the actual flow rate of the gasified fuel is controlled in accordance with the computed flow rate.

While the overall energy level is detected, an inlet gas temperature to the plant is set on the basis of the required power output of the power-generating plant, and a flow rate of gasified fuel to the combustor is computed from the set inlet gas temperature and the detected overall energy level possessed by the gasification fuel. The actual flow rate of the gasified fuel to the combustor is controlled in accordance with the computed flow rate.

When the detected energy level becomes lower than the necessary minimum value for maintaining combustion in the combustor, an auxiliary fuel is charged into the combustor and in accordance with the degree of lowering, and the computed flow rate of the gasified fuel is modified to control total heat load developed by combustion of the charged auxiliary fuel in the combustor to a set value.

Furthermore, the present invention provides an apparatus for controlling combustion of gasified fuel in a system for combustion of gasified fuel comprising a gasification unit for a low quality fuel, and a combustor for combusting the gasified fuel generated from the gasification unit, thereby producing a combustion gas, which comprises a detector unit for continuously detecting an overall energy level of sensible heat and heating value possessed per unit weight of gasified fuel to be led to the combustor on the basis of a combustion temperature of the gasified fuel sampled at a constant flow rate at the upstream side of the combustor, and a control unit for controlling a flow rate control valve for the gasified fuel in accordance with fluctuations in the overall energy level detected by the detector unit.

Furthermore, the present apparatus includes a system for charging an auxiliary fuel to the combustor through a flow rate control valve and a means for setting a flow rate of the auxiliary fuel by computing the necessary minimum energy level for maintaining combustion in the combustor from an air-fuel ratio of air to gasified fuel to the combustor, and setting the timing of the charging of auxiliary fuel and its flow rate on the basis of the computer limit energy level, the overal energy level possessed per unit weight of gasified fuel and the computed flow rate of the gasified fuel, thereby controlling the flow rate control valve for the auxiliary fuel.

In the present invention, the combustion gas is utilized in a power-generating plant, for example, a gas turbine unit, and the apparatus further includes a computing unit for computing a flow rate of gasified fuel to be led to the combustor from the overall energy level detected by the detector unit and the required output of the plant and a control unit for controlling the actual flow rate of gasified fuel to be led to the combustor on the basis of the computer flow rate.

The present invention will be described in detail below, referring to the accompanying drawings.

PREFERRED EMBODIMENTS OF THE INVENTION

Figure 2A:
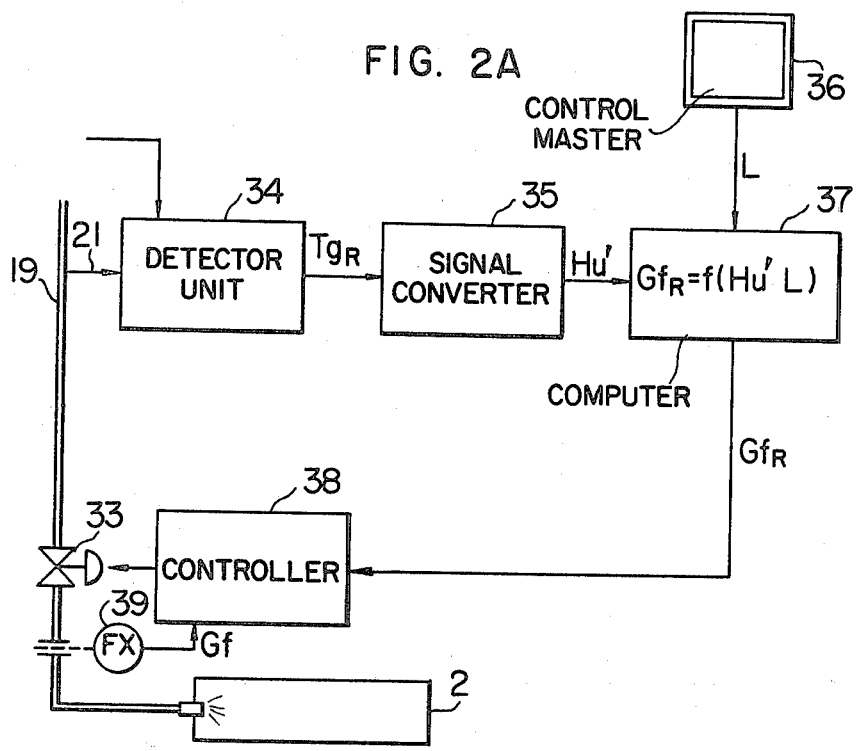
FIG. 2A is a flow diagram showing one embodiment of a combustion control of gasified fuel according to the present invention.
Figure 2B:
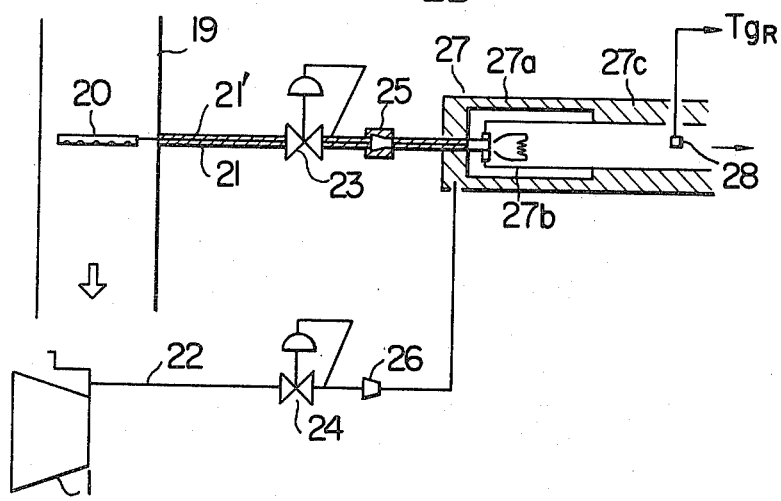
FIG. 2B is a schematic view of a detector unit for detecting energy level of gasified fuel for carrying out the present invention.

In FIG. 2A, one embodiment of combustion control according to the present invention is shown, where a fuel flow rate control valve 33 is provided in a sampled fuel line 19 for supplying gasified fuel to the combustor 2 for a gas turbine, and a detector unit 34 for detecting an energy level of gasified fuel is connected to sampled fuel line 19 through a sampling line 21. Signal converter 35 is connected to detector unit 34 at one end and to a flow rate computer 37 for computing the flow rate of gasified fuel at the other end. Flow rate computer 37 is connected to a control master 36 at one end, and to a controller 38 for a flow rate control valve 33 at the other end. A flow rate detector 39 is provided at the downstream side of flow rate control valve 33 and connected to controller 38. Detail of detector unit 34 is shown in FIG. 2B.

Detector unit 34 comprises a sampling tube 20 provided in fuel supply line 19, sampled fuel line connected to the sampling tube, a pressure reduction valve 23 and an orifice 25 provided in the sampled fuel line, an air line 22 connected to the outlet line of compressor 22 for the turbine, a pressure reduction valve 24 and an orifice 26 provided in the air line, a pilot combustor 27 for the sampled fuel, and a temperature detector 28 provided in the combustor.

Figure 1:
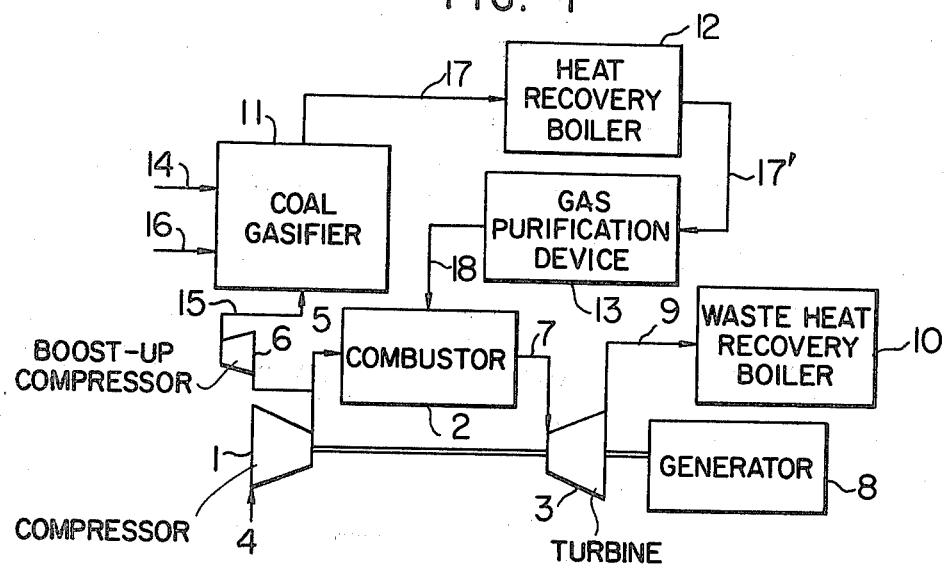
FIG. 1 is a flow diagram showing one embodiment of a coal gasification power plant, to which the present invention is applied.

Sampling tube 20 has many perforations for suction thereon to sample, at the upstream side of combustor 2, a portion of gasified fuel to be led to combustor 2 shown in FIG. 1 as a sampled fuel. Sampled fuel line 21 is covered with a heat-insulating material 21' to maintain the sampled fuel at the temperature prevailing at the sampling point. Pressure reduction valve 23 and orifice 25 provided in sampled fuel line 21 work to maintain the flow rate of sampled fuel constant even if the temperature of sampled fuel fluctuates.

Air line 22 extracts a portion of compressed air from compressor 1 as combustion air for the sampled fuel. Pressure reduction valve 24 and orifice 26 provided in air line 22 work to maintain the flow rate of air constant even if the temperature of extracted combustion air fluctuates, and are also set to supply the necessary air for satisfactory combustion, even if an expected fluctuation in heating value of the sample fuel becomes a maximum.

Combustor 27 for the sampled fuel has an outer cylinder 27a and an inner cylinder 27b. Outer cylinder 27a is covered with a heat-insulating material 27c. In combustor 27, the sampled fuel are combusted with the air at constant flow rates to produce combustion gas. The combustion gas produced in combustor 27 is led to waste heat recovery boiler 10 or the like shown in FIG. 1 to recover the heat. Waste heat recovery boiler or the like is operated substantially under atmospheric pressure, and consequently combustor 27 is kept under atmospheric pressure.

Temperature detector 28 detects a temperature $T_{gR}$ of combustion gas produced by the combustion of sampled fuel, and transmits the detected signal to signal converter 35.

Temperature of combustion gas $T_g$ resulting from combustion of gasified fuel is a function of three variables, i.e. fuel temperature $T_f$, fuel heating value $H_u$ and fuel flow rate $G_f$, as given heretofore by equation (1).

In the present invention, a portion of gasified fuel to be supplied to combustor 2, i.e., the primary combustor, is continuously sampled and combusted to detect the temperature of combustion gas $T_{gR}$ and then an overall energy level $H_{u'}$ of sensible heat and heating value possessed per unit weight of gasified fuel is determined from the temperature $T_{gR}$. That is, $T_{gr} \propto H_{u'}$.

By determining an overall energy level $H_{u'}$ of gasified fuel, fuel temperature $T_f$ and heating value $H_u$ can be determined among the variables determining the temperature of combustion gas $T_g$. Thus, unstable combustion due to fluctuation of heating value of gasified fuel and blow-out due to deficiency in heating value can be prevented by controlling an actual flow rate of gasified fuel on the basis of the overall energy level $H_{u'}$ of gasified fuel.

Signal converter 35 proportionally converts the signal of temperature of combustion gas $t_{gR}$ resulting from the combustion of sampled gas to an overall energy level $H_{u'}$ of gasified fuel, and the energy level signal is transmitted to flow rate computer 37 of gasified fuel.

Control master 36 transmits the signal of the output L required for turbine 3 of coal gasification power plant as shown in FIG. 1 to flow rate computer 37. Flow rate computer 37 computes a necessary fuel flow rate $G_{fR}$ for generating the required output L from the signal of the required output L and the energy level $H_{u'}$ of gasified fuel, which fluctuates from time to time. That is, the flow rate computer computes the following equation:

$$G_{fR} = f(H_{u'}, L)$$

where f is a function to obtain a fuel flow rate $G_{fR}$ from $H_{u'}$ and L. The signal of fuel flow rate $G_{fR}$ resulting from the computation is transmitted to controller 38.

Controller 38 adjusts the degree of opening of fuel flow rate control valve 33 on the basis of the signal of fuel flow rate $G_{fR}$ from flow rate computer 37 to control an actual flow rate of gasified fuel to be led to combustor 2.

Flow rate detector 39 detects controlled actual flow rate $G_f$ of gasified fuel and feeds back the detected flow rate signal to controller 38.

Figure 3:
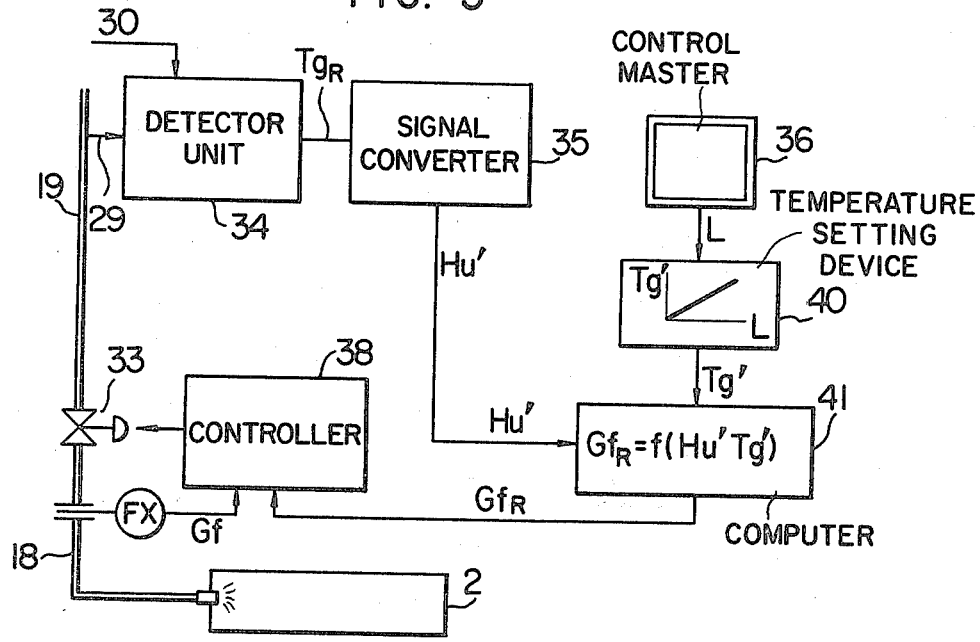
FIG. 3 is a flow diagram showing another embodiment of combustion control of gasified fuel according to the present invention.

In FIG. 3, another embodiment of combustion control according to the present invention is shown, where a temperature-setting device OR means 40 and other flow rate computer 41 than 37 are provided in addition to the members provided in the combustion control system shown in FIGS. 2A and 2B.

Temperature-setting means 40 sets a turbine inlet gas temperature $T_{g'}$ from the required output L of turbine 3 transmitted from control master 36. It can be presumed that the required output L of turbine and the turbine inlet gas temperature $T_{g'}$ are in a substantially proportional correlation therebetween. The set turbine inlet gas temperature $T_{g'}$ is transmitted therefrom to flow rate computer 41.

Flow rate computer 41 computes a fuel flow rate $G_{fR}$ from the set turbine inlet gas temperature $T_{g'}$ and the signal of overall energy level $H_{u'}$ of gasified fuel transmitted from signal converter 35 for converting the temperature of combustion gas $T_{gR}$ resulting from combustion of sampled fuel. That is, the flow rate computer computes the following equation:

$$G_{fR} = f(H_{u'}, T_{g'})$$

wherein f is a function to obtain a fuel flow rate from $H_{u'}$ and $T_{g'}$.

The signal of computer fuel flow rate $G_{fR}$ is transmitted therefrom to controller 38 and controls flow rate control valve 33 for gasified fuel on the basis of the signal of computer fuel flow rate $G_{fR}$.

In the embodiment shown in FIG. 3, the turbine output becomes very close to the required output L transmitted from control master 36, though not identical therewith, and stable operation can be carried out so that the actual turbine inlet gas temperature can approach the set temperature $T_{g'}$.

Structure and function of other members in the combustion control system shown in FIG. 3 are the same as shown in FIGS. 2A and 2B, and other processes of combustion control based on the system shown in FIG. 3 are the same as shown in FIGS. 2A and 2B.

Figure 4:
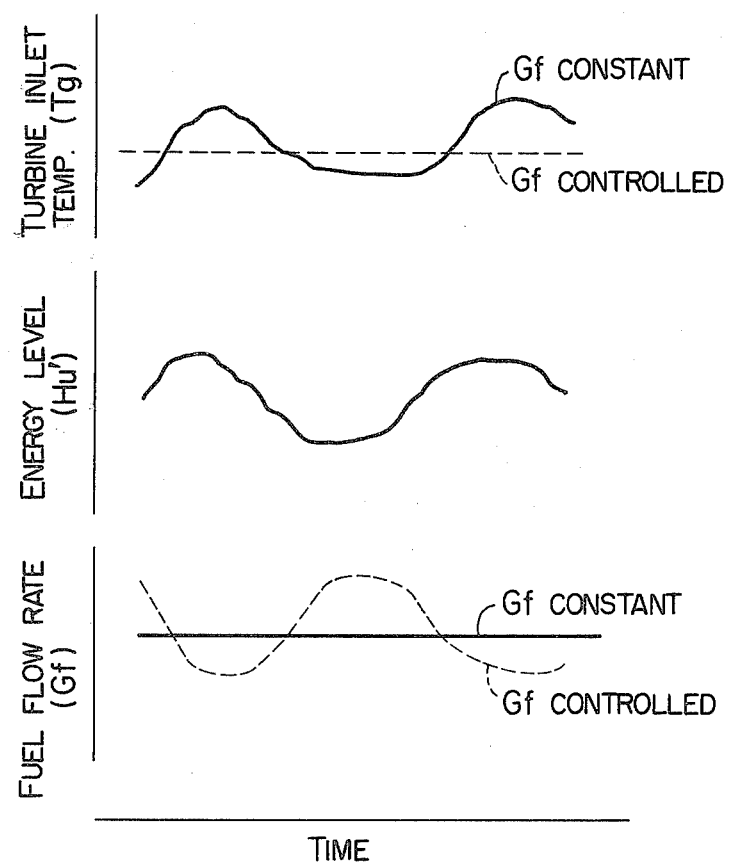
FIG. 4 is a diagram showing combustion characteristics in the case of controlling the flow rate of gasified fuel according to the present invention and in the case of not controlling the flow rate of gasified fuel.

FIG. 4 shows comparison of the case of detecting an overall energy level $H_{u'}$ of gasified fuel and controlling a fuel flow rate $G_{fR}$ on the basis of the detected energy level according to the present invention, shown by dotted line, with the case of not controlling the fuel flow rate, shown by a full line with respect to turbine inlet gas temperature. As is obvious from FIG. 4, turbine can be stably operated by detecting $H_{u'}$ and controlling $G_{fR}$.

Figure 5:
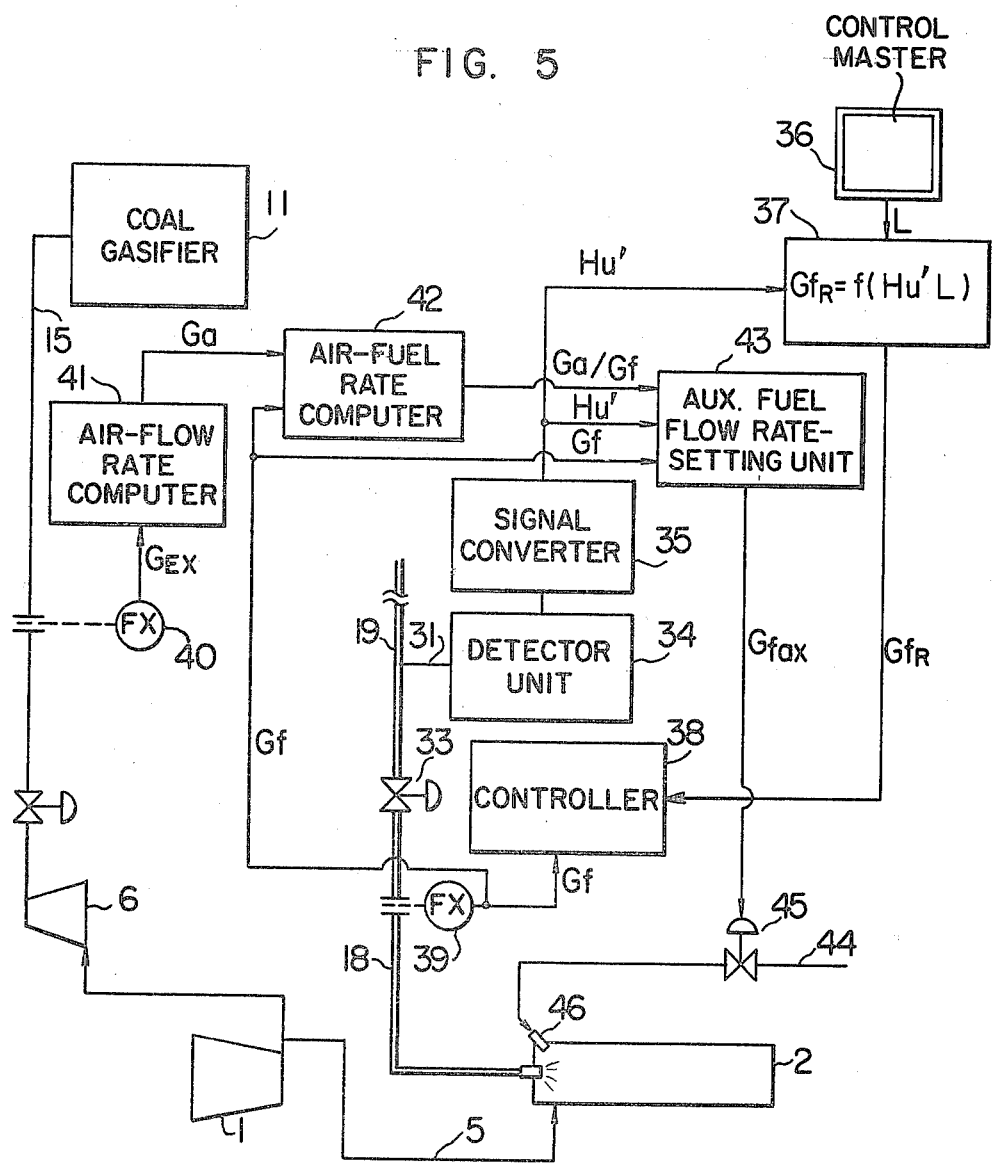
FIG. 5 is a flow diagram showing other embodiment of combustion control of gasified fuel according to the present invention.

In FIG. 5, another embodiment of combustion control according to the present invention is shown, where an auxiliary fuel-charging system having a flow rate control valve 45 and a control system for the flow rate control valve 45 are provided in addition to the combustion control system for gasified fuel shown in FIGS. 2A and 2B as well as FIG. 1. The auxiliary fuel charging system charges a fuel of high heating value such as light oil, kerosene, etc. to combustor 2 through an auxiliary fuel line 44, a flow rate control valve 45 and a nozzle 46 for auxiliary fuel to carry out auxiliary combustion.

The control system for flow rate control valve 45 for auxiliary fuel comprises an extracted air flow rate detector 40, an air flow rate computer 41, an air-fuel ratio computer 42 and an auxiliary fuel flow rate-setting means or unit 43.

Extracted air flow rate detector 40 detects a flow rate $G_{EX}$ of air extracted from compressor 1, compressed by boost-up compressor 6 and led to coal gasifier furnace 11 and the detected signal $G_{EX}$ is transmitted to air flow rate computer 41.

Air flow rate computer 41 computes an air flow rate $G_a$ to combustor 2 from the predetected discharged air flow rate of compressor 1 and the detected extracted air flow rate $G_{EX}$, and the computed signal $G_a$ is transmitted to air-fuel ratio computer 42.

Air-fuel ratio computer 42 receives fuel flow rate $G_f$ from fuel rate detector 39 in addition to the air flow rate $G_a$, and computes air-fuel ratio $G_a/G_f$ from these two input signals, and the computed signal $G_a/G_f$ is transmitted to auxiliary fuel flow rate-setting means 43.

Auxiliary fuel flow rate-setting means 43 receives the signal of overall energy level $H_{u'}$ possessed per unit weight of gasified fuel from signal converter 35 and the signal of fuel flow rate $G_f$ from fuel flow rate detector 39 in addition to the signal of air-fuel ratio $G_a/G_f$. Computation in auxiliary fuel flow rate-setting means depends upon the structure of combustor 2, combustion characteristics, and properties of auxiliary fuel.

Auxiliary fuel flow rate-setting means 43 computes the necessary minimum energy level $H_{u'l}$ for maintaining combustion in combustor 2 from the air-fuel ratio $G_a/G_f$.

Figure 6:
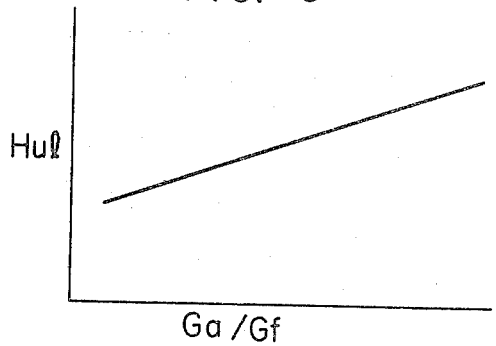
FIG. 6 is a diagram showing relations between the air-fuel ratio of combustion air to gasified fuel to a combustor and the maximum necessary energy level as the limit level for maintaining combustion in the combustor at a given air-fuel ratio.

The relations between the air-fuel ratio $G_a/G_f$ and the necessary minimum energy level $H_{u'l}$ for maintaining combustion in combustor 2 are as shown in FIG. 6, depending upon the characteristics of designed combustor 2, and thus the necessary minimum energy level $H_{u'l}$ for maintaining combustion in combustor 2 can be determined from the air-fuel ratio $G_a/G_f$. That is, a larger air-fuel ratio $G_a/G_f$ brings the inside of combustor 2 into a fuel-deficient state and a fuel of a high energy level is required for maintaining the combustion, and the minimum energy level $H_{u'l}$ is the necessary limit value for maintaining combustion in combustor 2. When the energy level $H_{u'}$ of gasified fuel is lower than the necessary limit value, an auxiliary fuel is charged into combustor 2. Timing of charging the auxiliary fuel is determined as described above.

Then, auxiliary fuel flow rate-setting means 43 computes deficient energy level $(H_{u'l} - H_{u'}) G_f$ from the necessary minimum energy level $H_{u'l}$ for maintaining combustion in combustor 2, the overall energy level $H_{u'}$ of gasified fuel, and the fuel flow rate $G_f$, and further computes auxiliary fuel flow rate $G_{fax}$ on the basis of the deficient energy level $(H_{u'l} - H_{u'}) G_f$.

Figure 7:
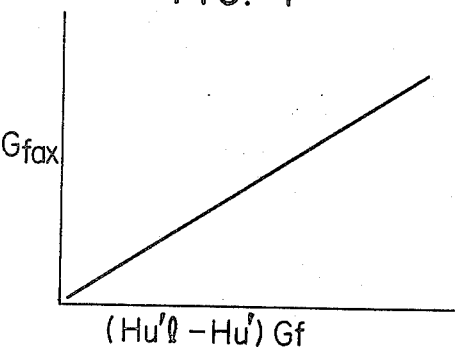
FIG. 7 is a diagram showing relations between the deficient energy level of gasified fuel to a combustor and the flow rate of auxiliary fuel to be charged.

In FIG. 7 relations between the deficient energy level $(H_{u'l} - H_{u'}) G_f$ and the auxiliary fuel flow rate $G_{fax}$ are shown. By computing a deficient energy level $(H_{u'l} - H_{u'}) G_f$, a flow rate $G_{fax}$ of the auxiliary fuel to be charged to combustor 2 can be obtained from the relations shown in FIG. 7.

The timing of charging the auxilairy fuel and its flow rate $G_{fax}$ are computed by auxiliary fuel flow rate-setting means 43, as described above, and the computed signals are transmitted to auxiliary fuel flow rate control valve 45 to open the flow rate control valve 45 and also adjust its degree of opening. Thus, the auxiliary fuel is charged into combustor 2 at the necessary flow rate, so that unstable combustion due to fluctuations in the overall energy level of gasified fuel and blow-out due to deficient energy level can be completely prevented.

Figure 8:
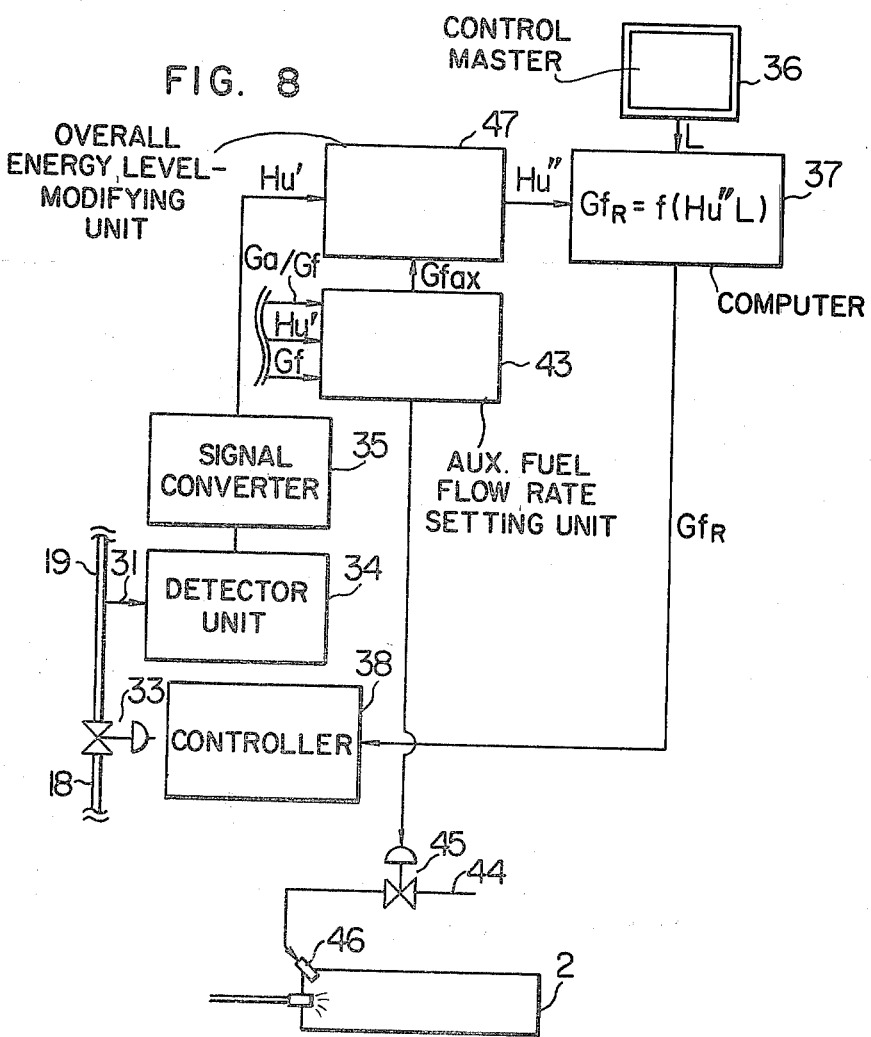
FIG. 8 is a flow diagram showing still other embodiment of combustion control of gasified fuel according to the present invention.

In FIG. 8 still other embodiment of combustion control according to the present invention is shown, where an overall energy level-modifying means 47 is provided in addition to the members of combustion control system shown in FIG. 5.

When the overall energy level $H_{u'}$ of gasified fuel becomes lower than the necessary minimum value for maintaining combustion in combustion 2, an auxiliary fuel is charged into combustor 2, as described above, and total heat load developed by combustion in combustor 2 is increased correspondingly by the charged auxiliary fuel.

In the embodiment shown in FIG. 8, overall energy level-modifying means 47 receives the signal of overall energy level $H_{u'}$ of gasified fuel from signal converter 35 and the signal of auxiliary fuel flow rate $G_{fax}$ from auxiliary fuel flow rate-setting unit or means 43, and computes the following equation on the basis of the two signals to obtain modified overall energy level $H_{u''}$.

$$H_{u''} = \frac{H_{uax} \times G_{fax} + G_f \times H_{u'}}{(G_f + G_{fax})}$$

wherein $H_{uax}$ is the heating value of auxiliary fuel.

The signal of modified overall energy level $H_{u''}$ obtained by the computation is transmitted to fuel flow rate computer 37 to modify fuel flow rate $G_{fR}$ from the required output L and modified overall energy level $H_{u''}$, and controller 38 controls fuel flow rate control valve 33 on the basis of the modified flow rate to maintain total heat load developed by combustion in combustor 2 constant. Thus, the combustion can be carried out stably.

The present invention is applicable not only to a system of gasifying coal and combusting the resulting gasified fuel, but also generally to a system using the resulting combustion gas as an energy source for generating power.

Since a flow rate of gasified fuel to be led to a combustor is controlled in accordance with fluctuations in the overall energy level of gasified fuel according to the present invention, combustion of gasified fuel can be automatically controlled in accordance with fluctuation in temperature and heating value of gasified fuel from time to time, if necessary, by charging an auxiliary fuel to a combustor. Also, total heat load developed by combustion of auxiliary fuel in a combustor can be controlled to the set value by modifying the flow rate of gasified fuel. Thus, unstable combustion due to fluctuations in the heating value of gasified fuel and blow-out due to the deficient heating value can be effectively prevented, and a power-generating plant using the combustion gas of gasified fuel can be stably and continuously operated.

What is claimed is:

1. A method for controlling the combustion of gasified fuel in a process for combustion of gasified fuel by gasifying a low quality fuel and combusting the resulting gasified fuel in a combustor, which comprises continuously sampling a gasified fuel at a constant flow rate at the upstream side of the combustor, combusting the sampled gasified fuel, thereby detecting an overall energy level of sensible heat and heating value possessed per unit weight of the gasified fuel on the basis of a combustion temperature of the sampled gasified fuel, controlling an actual flow rate of the gasified fuel to the combustor in accordance with fluctuations in the detected overall energy level and charging an auxiliary fuel into the combustor, when the detected overall energy level becomes lower than the necessary minimum value for maintaining combustion in the combustor.

2. A method according to claim 1 for controlling combustion of gasified fuel in a process for combustion of gasified fuel by gasifying a low quality fuel, combusting the resulting gasified fuel in a combustor and further using the combustion gas from said combustor in a power-generating plant, which further comprises computing a flow rate of the gasified fuel to the combustor on the level of the detected overall energy level and the required output of the power-generating plant, and controlling an actual flow rate of the gasified fuel on the basis of the computed flow rate.

3. A method according to claim 1 for controlling combustion of gasified fuel in a process for combustion of gasified fuel by gasifying a low quality fuel, combusting the resulting gasified fuel in a combustor and further using the combustion gas from said combustion in a power-generating plant, which further comprises setting an inlet gas temperature of the plant from required output of the plant, computing a flow rate of the gasified fuel to the combustor on the basis of the set inlet gas temperature and the detected overall energy level, and controlling an actual flow rate of the gasified fuel on the basis of the computed flow rate.

4. A method for controlling combustion of gasified fuel in a process for combustion of gasified fuel by gasifying a low quality fuel and combusting the resulting gasified fuel in a combustor, which comprises continuously sampling a gasified fuel at a constant flow rate at the upstream side of the combustor, combusting the sampled gasified fuel, thereby detecting an overall energy level of sensible heat and heating value possessed per unit weight of the gasified fuel on the basis of a combustion temperature of the sampled gasified fuel, controlling an actual flow rate of the gasified fuel to the combustor in accordance with fluctuations in the detected overall energy level and when the detected overall energy level becomes lower than a minimum level, charging an auxiliary fuel into the combustor in an amount corresponding to an energy amount sufficient to raise the total energy level of the gasified fuel and the auxiliary fuel to the the minimum level.

5. A method according to claim 4, for controlling combustion of gasified fuel in a process for combustion of gasified fuel by gasifying a low quality fuel, combusting the resulting gasified fuel in a combustor and further using the combustion gas from the combustor in a power-generating plant, which further comprises computing a flow rate of the gasified fuel to the combustor on the level of the detected overall energy level and required output of the power-generating plant, and controlling an actual flow rate of the gasified fuel on the basis of the computed flow rate.

6. A method according to claim 4, for controlling combustion of gasified fuel in a process for combustion of gasified fuel by gasifying a low quality fuel, combusting the resulting gasified fuel in a combustor and further using the combustion gas from the combustor in a power-generating plant, which further comprises setting an inlet gas temperature of the plant from required output of the plant, computing a flow rate of the gasified fuel to the combustor on the basis of the set inlet gas temperature and the detected overall energy level, and controlling an actual flow rate of the gasified fuel on the basis of the computed flow rate.

7. A method for controlling combustion of gasified fuel in a process for combustion of gasified fuel by gasifying a low quality fuel and combusting the resulting gasified fuel in a combustor, which comprises continuously sampling a gasified fuel at a constant flow rate at the upstream side of the combustor, combusting the sampled gasified fuel, thereby detecting an overall energy level of sensible heat and heating value possessed per unit weight of the gasified fuel on the basis of a combustion temperature of the sampled gasified fuel, computing a flow rate of the gasified fuel to the combustor on the level of the detected overall energy level, controlling an actual flow rate of the gasified fuel to the combustor in accordance with fluctuations in the detected overall energy level and charging an auxiliary fuel into the combustor, when the detected overall energy level becomes lower than the necessary minimum value for maintaining combustion in combustor, and modifying the computed flow rate of the gasified fuel thereby to control total heat load developed by combustion of the charged auxiliary fuel in the combustor to a set value.

8. A method for controlling combustion of gasified fuel in a process for combustion of gasified fuel by gasifying a low quality fuel, combusting the resulting gasified fuel in a combustor and using the combustion gas in a power-generating plant, which comprises continuously sampling a gasified fuel at a constant flow rate at the upstream side of the combustor, combusting the sampled gasified fuel, thereby detecting an overall energy level of sensible heat and heating value possessed per unit weight of the gasified fuel on the basis of a combustion temperature of the sampled gasified fuel, computing a flow rate of the gasified fuel to the combustor on the level of the detected overall energy level and required output of the power-generating plant, controlling an actual flow rate of the gasified fuel on the basis of the computed flow rate and charging on auxiliary fuel into the combustor, when the detected overall energy level becomes lower than the necessary minimum value for maintaining combustion in combustor, and modifying the computed flow rate of the gasified fuel thereby to control total heat load developed by combustion of the charged auxiliary fuel in the combustor to a set value.

9. A method for controlling combustion of gasified fuel in a process for combustion of gasified fuel by gasifying a low quality fuel, combusting the resulting gasified fuel in a combustor and using the combustion gas in a power-generating plant, which comprises continuously sampling a gasified fuel at a constant flow rate at the upstream side of the combustor, combusting the sampled gasified fuel, thereby detecting an overall energy level of sensible heat and heating value possessed per unit weight of the gasified fuel on the basis of a combustion temperature of the sampled gasified fuel, setting an inlet gas temperature of the plant from required output of the plant, computing a flow rate of the gasified fuel to the combustor on the basis of the set inlet gas temperature and the detected overall energy level, controlling an actual flow rate of the gasified fuel on the basis of the computed flow rate and charging an auxiliary fuel into the combustor, when the detected overall energy level becomes lower than the necessary minimum value for maintaining combustion in combustor, and modifying the computed flow rate of the gasified fuel thereby to control total heat load developed by combustion of the charged auxiliary fuel in the combustor to a set value.

10. An apparatus for controlling combustion of gasified fuel in a system for combustion of gasified fuel comprising a gasifier for a low quality fuel, and a primary combustor for combusting the gasified fuel generated from the gasification unit, thereby producing a combustion gas, which comprises a detector unit for continuously detecting an overall energy level of sensible heat and heating value possessed per unit weight of the gasified fuel to be led to the primary combustor on the basis of a combustion temperature of the gasified fuel continuously sampled at a constant flow rate at the upstream side of the combustor, said detector unit comprising a pilot combustor for combusting a sample of the gasified fuel and a temperature detecting means for detecting the temperature of combustion within said pilot combustor, a control unit for controlling a flow rate control valve for the gasified fuel in accordance with fluctuations in the overall energy level detected by the detector unit and means for charging an auxiliary fuel to the primary combustor through a flow rate control valve and means for setting a flow rate of the auxiliary fuel by computing the necessary minimum energy level for maintaining combustion in the primary combustor from an air-fuel ratio of air to gasified fuel to the primary combustor, and setting the timing of charging auxiliary fuel and its flow rate on the basis of the computed limit energy level, the overall energy level possessed per unit weight of gasified fuel and the computed flow rate of the gasified fuel, thereby controlling the flow rate control value for the auxiliary fuel.

11. An apparatus for controlling combustion of gasified fuel in a system for combustion of gasified fuel comprising a gasification unit for a low quality fuel, a primary combustor for combusting the gasified fuel generated from the gasification unit, and a power-generating plant using the resulting combustion gas, which comprises a detector unit for continuously detecting an overall energy level of sensible heat and heating value possessed per unit weight of the gasified fuel to be led to the combustor on the basis of a combustion temperature of the gasified fuel continuously sampled at a constant flow rate at the upstream side of the combustor, said detector unit comprising a pilot combustor for combusting a sample of the gasified fuel and a temperature detecting means for detecting the temperature of combustion within said pilot combustor, a computer for computing a flow rate of the gasified fuel to be led to the combustor from the detected overall energy level and a required output of the plant, a control unit for controlling a flow rate control valve for the gasified fuel on the basis of the computed flow rate, means for charging an auxiliary fuel to the primary combustor through a flow rate control valve and means for setting a flow rate of the auxiliary fuel by computing the necessary minimum energy level for maintaining combustion in the primary combustor for an air-fuel ratio of air to gasified fuel to the primary combustor, and setting timing of charging auxiliary fuel and its flow rate on the basis of the computed limit energy level, the overall energy level possessed per unit weight of gasified fuel and the computed flow rate of the gasified fuel, thereby controlling the flow rate control value for the auxiliary fuel.

* * * * *